(12) United States Patent
Coffey et al.

(10) Patent No.: US 7,300,377 B2
(45) Date of Patent: Nov. 27, 2007

(54) POWER TRANSMISSION LUBRICATION SYSTEM

(75) Inventors: Dan Coffey, Howell, MI (US); Boris I. Burgman, Oak Park, MI (US)

(73) Assignee: GM Global Technology Operations, Inc., Detroit, MI (US)

(*) Notice: Subject to any disclaimer, the term of this patent is extended or adjusted under 35 U.S.C. 154(b) by 126 days.

(21) Appl. No.: 11/233,615

(22) Filed: Sep. 23, 2005

(65) Prior Publication Data

US 2007/0072735 A1 Mar. 29, 2007

(51) Int. Cl.
*F16H 57/04* (2006.01)

(52) U.S. Cl. ...................... 475/159; 475/337

(58) Field of Classification Search ............... 475/146, 475/159, 160, 337, 346; 74/468; 184/11.2; 384/606
See application file for complete search history.

(56) References Cited

U.S. PATENT DOCUMENTS

| 5,429,374 | A | * | 7/1995 | Eichenberger | 277/552 |
| 5,928,100 | A | * | 7/1999 | Ohtake et al. | 475/159 |
| 7,189,183 | B2 | * | 3/2007 | Fugel et al. | 475/331 |
| 2003/0167869 | A1 | * | 9/2003 | Burgman et al. | 74/412 R |

* cited by examiner

*Primary Examiner*—Sherry Estremsky
*Assistant Examiner*—Edwin A Young

(57) ABSTRACT

A planetary transmission includes a plurality of planetary gearsets. The planetary gearsets have a lubrication system comprised of pinion pins secured in side plates and central passages located within the pinion pins. The central passages or cavities have radially outwardly disposed fluid passages, which supply fluid lubrication to support bearings for the pinion pins of the respective planetary gearsets. Lubrication fluid is communicated into the cavities when thrust loads are imposed on the planetary gearsets and the thrust bearings disposed between adjacent planetary gearsets reduces the flow area for the lubrication fluid.

6 Claims, 1 Drawing Sheet

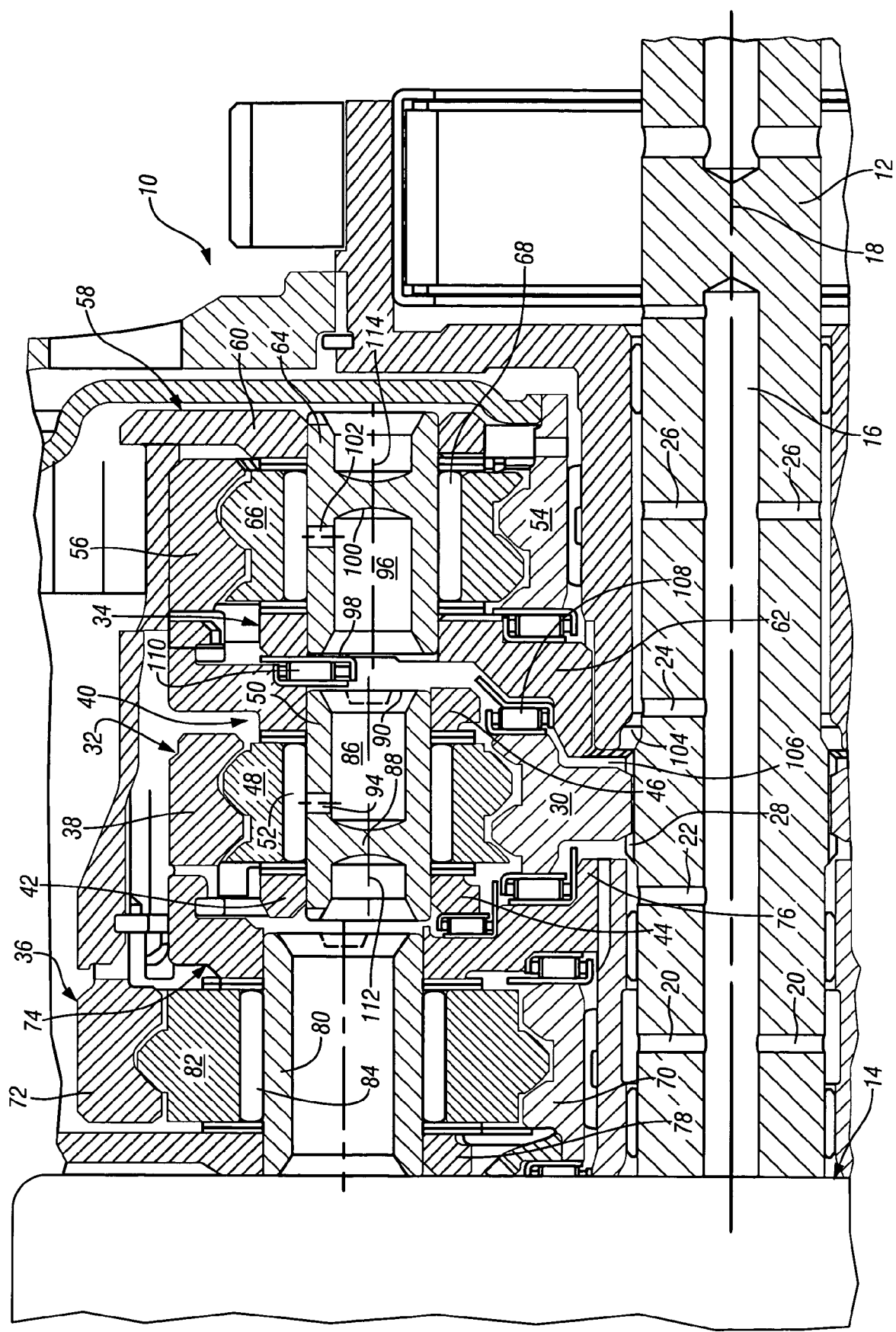

1

POWER TRANSMISSION LUBRICATION SYSTEM

TECHNICAL FIELD

This invention relates to power transmissions and, more particularly, to the lubrication of planetary gearsets within power transmissions.

BACKGROUND OF THE INVENTION

Planetary power transmissions incorporate a plurality of planetary gearsets that are disposed within a housing and subject to various thrust and torque loads. These planetary gearsets must be lubricated and sometimes cooled in order to function efficiently and properly.

The lubrication of the planetary gearsets, which are often deep within the mechanism that is covered by other components, need to have the lubrication fluid directed to their innermost surfaces so it can be fed outwardly to lubricate the gearing components.

Generally, the lubrication system in planetary transmissions is by way of an oil gallery or passage within the transmission input shaft. The oil within this passage is then fed outwardly through radially extending passages, which communicate with the central portion of the planetary gearsets. From this point, the fluid is allowed to flow radially outward as the transmission components are rotating. The lubrication does not account for the thrust loading on the planetary gearsets. During thrust loading or torque loading, the lubrication is more important and care must be taken to ensure that the parts are properly lubricated during these high level instances.

SUMMARY OF THE INVENTION

It is an object of the present invention to provide an improved lubrication mechanism in a planetary transmission.

In one aspect of the present invention, lubrication fluid is distributed from a central location into a path between adjacent planetary gearsets.

In another aspect of the present invention, the passage between the planetary gearsets also includes a thrust bearing, which serves to deflect fluid in the intermediate space and to the planetary gearsets.

In still another aspect of the present invention, the thrust bearing disposed between the planetary gearsets provides increased flow resistance when one or more of the planetary gearsets are loaded.

In yet another aspect of the present invention, the planetary gearsets each include a plurality of pinion gears rotatably mounted on pinion pins, which are held stationary or non-rotatably within the planetary carrier.

In yet still another aspect of the present invention, the support pins include central recesses in which fluid between the planetary gearsets is collected and distributed through radially facing outward passages directly into support bearings for the pinion gears.

DESCRIPTION OF THE DRAWINGS

FIG. 1 is a sectional view of a portion of a planetary transmission.

DESCRIPTION OF AN EXEMPLARY EMBODIMENT

Referring to the drawing, there is seen a portion 10 of a planetary transmission. This portion 10 shows a transmission input shaft 12, which is drivingly connected in a conventional manner with a torque converter, not shown, or other input mechanism for the transmission. The input shaft 12 drives a plurality of torque-transmitting mechanisms, generally shown at 14, which include conventional fluid-operated clutch mechanisms. The input shaft 12 includes an oil gallery or passage 16, which is centrally disposed along the longitudinal axis 18 of the input shaft 12.

The oil gallery 16 has a plurality of radially extending passages 20, 22, 24, and 26. Also formed on the input shaft 12 is a spline portion 28, which is drivingly connected with a sun gear member 30. The sun gear member 30 is a component of a planetary gearset, generally designated 32. The transmission 10 also includes a second planetary gearset 34 and a third planetary gearset 36.

The planetary gearset 32 includes a ring gear member 38 and a planet carrier assembly 40. The planet carrier assembly 40 includes a planet carrier member 42, which is comprised of side plates 44 and 46, a plurality of pinion gears 48, mounting pins 50, and support bearings 52. The pinion pins 50 are secured for nonrotation within the side plates 44 and 46. The pinion gears 48 are rotatably mounted on the support bearings 52, which are rotatably mounted on the pins 50. The pinion gears 48 mesh with the sun gear member 30 and the ring gear member 38, respectively, to provide for torque transmission between these components.

The planetary gearset 34 includes a sun gear member 54, a ring gear member 56, and a planet carrier assembly 58. The planet carrier assembly 58 is comprised of side plates 60 and 62, pinion pins 64, pinion gears 66, and support bearings 68. The pins 64 are secured in the side plates 60 and 62 for nonrotation relative thereto. The pinion gears 66 are rotatably mounted on the bearings 68, which in turn are mounted on the pins 64.

The planetary gearset 36 includes a sun gear member 70, a ring gear member 72, and a planet carrier assembly 74. The planet carrier assembly 74 is comprised of side plates 76 and 78 in which are secured a plurality of pins 80, which in turn rotatably mount a plurality of pinion gears 82 through support bearings 84.

The pins 50 have a central cavity or recess passage 86, which is closed at 88 and open at 90 to a space or passage 92 formed between the side plate 46 and the side plate 62. The central recess 86 has a radially outwardly facing passage 94, which communicates with the support bearings 52. The pinion pins 64 include a central cavity or recess passage 96, which has an open end 98 and a closed end 100. The open end 98 faces the space 92. Communicating between the bearings 68 and the cavity 96 is a radially extending passage 102.

The passage 24 formed in the shaft 12 communicates through a longitudinal space 104 with a radial space 106. The radial space 106 is in communication with a thrust bearing 108 disposed between the side plate 62 and the sun gear member 30. The space 92 communicates through the bearing 108 with the space 106.

Radially outwardly of the space 96 is a thrust bearing 110, which supports thrust loading between the side plate 62 and the side plate 46. The fluid in the passage 16 is supplied from a conventional transmission hydraulic control system, not shown. The fluid within the passage 16 is generally a low-pressure fluid, which is supplied with bypass fluid from the system regulator valve. The pressure within passage 16 flows radially outward through the passages 20, 22, 24, and 26. The fluid in passage 26 flows radially outward through the space 106 past the bearing 108 into the space 92 and past the bearing 110 to be distributed outwardly of the bearing 110.

However, when a load is imposed on the planetary gearset 32 or on the planetary gearset 34, or on both of these planetary gearsets, the side plates 62 and 46 are urged toward each other thereby closing the space available to oil flow through the bearing 110. When thrust loads are present at either side plate 62 or 46, the fluid flow within the space 92 is directed axially or longitudinally outward into the cavities 96 and 86. The fluid pressure in these cavities is directed through the passages 102 and 94, respectively, to lubricate the bearings 68 and 52, respectively. When the thrust loads are not present on the side plates 62 and 46, the space at bearing 110 is more open and the lubrication fluid flows through and outwardly from the bearing 110. Since very little lubrication is required when the planetary gearsets 34 and 32 are unloaded or not carrying torque, this system operates very effectively and provides improved lubrication whenever a thrust load is present on either of the planetary gearsets 32 or 34.

The thrust bearings. 110 therefore act as a temporary dam or flow deflecting mechanism whenever the thrust loads are present. The closed ends 88 and 100 of the cavities 86 and 96 prevent fluid within the passage 92 from flowing longitudinally outward and ensuring that the fluid is directed into the passages 94 and 102, respectively.

When the thrust loads are present, the fluid within the space 92 will flow above the longitudinal centerline 112 of pins 50 and also above centerline 114 of pins 64. The oil that fills above the centerline 114 is ejected through the passages 94 and 102, respectively, and may also spill past the bearing 110 if the levels are sufficient to provide the lubrication necessary for the bearings 52 and 68.

The invention claimed is:

1. A planetary transmission comprising:
    an input shaft;
    a plurality of lubrication passages formed in said input shaft;
    a first planetary gearset having a sun gear member, a ring gear member, and planet carrier assembly including a plurality of pinion gears rotatably mounted on pinion pins held non-rotatably within side plates of said planet carrier assembly and having a central cavity open to a space;
    a second planetary gearset having a sun gear member, a ring gear member, and plurality of pinion gear members rotatably mounted on pinion pins secured non-rotatably in side plates of a planet carrier assembly, and said pinion pins having a central cavity open to said space;
    each of said pinion pins having a closed end and a radially outwardly directed passage connected with said cavity and disposed to direct fluid within said cavities to bearing members rotatably supporting said pinion gears; and
    a bearing for causing fluid flow between said first and second planetary gear sets to enter said central cavities.

2. The planetary transmission defined in claim 1 wherein said bearing being between said side plates of said planet carrier assembly of said first planetary gearset and said side plates of said planet carrier assembly of said second planetary gearset create a flow restriction to cause fluid flow between said first and second planetary gearsets.

3. The planetary transmission defined in claim 1 wherein said plurality of lubrication passages radially extend from said input shaft.

4. The planetary transmission defined in claim 1 wherein said space is defined by said first and said second planetary gearsets.

5. A planetary transmission comprising:
    an input shaft;
    a plurality of lubrication passages formed in said input shaft;
    a first planetary gearset having a sun gear member, a ring gear member, a planet carrier assembly including a plurality of pinion gears rotatably mounted on pinion pins held non-rotatably within first and second side plates of said planet carrier assembly and having a central cavity open to a space adjacent said first side plates;
    a second planetary gearset having a sun gear member, a ring and plurality of pinion gear members rotatably mounted on pinion pins secured non-rotatably in third and fourth side plates of a planet carrier assembly, and said pinion pins having a central cavity open to said space adjacent said third side plate;
    each of said pinion pins having a closed end and a radially outwardly passage connected with said cavity and disposed to direct fluid within said cavities to bearing members rotatably supporting said pinion gears; and
    thrust bearing means between said first and third side plates for creating a flow restriction to cause fluid flow between said first and second planetary gear sets to enter said cavities.

6. The planetary transmission defined in claim 5 further comprising:
    said thrust bearing means being effective to cause said flow restriction when one or both of said planet carrier assemblies are torque carrying members.

* * * * *